United States Patent
Yu et al.

(10) Patent No.: US 10,775,913 B2
(45) Date of Patent: Sep. 15, 2020

(54) TOUCH SENSOR INTEGRATED DISPLAY DEVICE AND METHOD OF MANUFACTURING THE SAME

(71) Applicant: LG Display Co., Ltd., Seoul (KR)

(72) Inventors: Jae Sung Yu, Seoul (KR); SangSoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/320,248

(22) Filed: Jun. 30, 2014

(65) Prior Publication Data

US 2015/0378486 A1 Dec. 31, 2015

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/044; G06F 3/0412; G06F 3/0416
See application file for complete search history.

(56) References Cited

U.S. PATENT DOCUMENTS

| | | | | |
|---|---|---|---|---|
| 7,859,521 B2 * | 12/2010 | Hotelling | ............... | G06F 3/0412 178/18.03 |
| 9,128,561 B2 * | 9/2015 | Lee | ....................... | G06F 3/0416 |
| 2009/0091551 A1 * | 4/2009 | Hotelling | ............... | G06F 3/0416 345/174 |
| 2009/0266621 A1 * | 10/2009 | Huang | .................... | G06F 3/044 178/18.01 |
| 2010/0110038 A1 * | 5/2010 | Mo | ......................... | G06F 3/044 345/174 |
| 2010/0144391 A1 * | 6/2010 | Chang | ................. | G02F 1/13338 455/566 |
| 2010/0253638 A1 * | 10/2010 | Yousefpor | ............. | G06F 3/0416 345/173 |
| 2013/0147724 A1 * | 6/2013 | Hwang | ................. | G06F 3/0412 345/173 |
| 2013/0265244 A1 * | 10/2013 | Kim | ........................ | G06F 3/044 345/173 |
| 2013/0293513 A1 * | 11/2013 | Hotelling | .............. | G06F 3/0412 345/174 |
| 2013/0335365 A1 * | 12/2013 | Kim | ........................ | G06F 3/044 345/174 |
| 2014/0071066 A1 * | 3/2014 | Lee | ........................ | G06F 3/0416 345/173 |

* cited by examiner

*Primary Examiner* — Jeff Piziali
(74) *Attorney, Agent, or Firm* — Fenwick & West LLP (57) ABSTRACT

A touch sensor integrated display device includes a plurality of common electrode blocks serving as touch driving blocks and touch sensing blocks. Conductive lines connected to the touch driving blocks and touch sensing blocks are routed towards an inactive area of the display device by directly across the active area. The conductive lines are positioned within one or more organic dielectric layers formed under the common electrode blocks and pixel electrodes, but above the data lines of the display device.

13 Claims, 8 Drawing Sheets

TOUCH SENSOR INTEGRATED DISPLAY DEVICE AND METHOD OF MANUFACTURING THE SAME

BACKGROUND OF THE INVENTION

Field of the Invention

The present disclosure generally relates to a display device, and more particularly to a display device configured for advanced mutual capacitance touch sensing and a method for manufacturing the same.

Description of the Related Art

Touch screens have been one of the most popular user input mechanism in a variety of electronic devices because of their ease and versatility of operation. Such a touch screen allows to identify the occurrence and position of a user's touches on the screen, enabling the electronic device to respond appropriately. Conventionally, touch screens may be flat panel displays such as liquid crystal displays (LCDs) or organic light emitting diode (OLED) displays overlaid with a touch panel.

Conventionally, a grid of touch driving lines and touch sensing lines or a separate touch panel with the touch driving and sensing lines are overlaid across a display device. These touch drive and touch sense lines are often made up of substantially transparent conductive material, such as indium tin oxide (ITO), and arranged in rows and columns on a substantially transparent substrate. When an object, such as a user's finger, is near an intersection of a touch drive line and a touch sense line, a capacitance between the touch drive line and touch sense line may change. This change in capacitance may indicate that a touch is occurring at this location.

However, overlaying such a separate capacitive touch sensor panel can add thickness and weight to the display device. For this reason, it has been attempted to integrate touch screen components into display pixel of a display device. In such an In-Cell type touch enabled display device, the integrated touch screen components may have a relatively high resistance and/or may capacitively couple to other display components, leading to unsatisfactory display quality and touch accuracy. This is especially true for in-plane-switching (IPS) mode and fringe-field-switching (FFS) mode LCD devices, which have the electrodes for controlling the orientation of the liquid crystal molecules on a single substrate.

Accordingly, there is a need for a display device with improved configuration for sensing touch inputs on display devices.

SUMMARY OF THE INVENTION

The present disclosure relates to a display device integrated with a touch sensor as well as configuration of touch sensor elements along with various elements of displays such as LCD, organic light emitting diode (OLED) display, and the like. In a display device, several elements can be grouped together to form a circuit for recognizing user inputs on or near the display. Touch sensing circuit may include, for example, touch signal lines (e.g., touch driving lines, touch sensing lines).

To provide a display device with a more advanced integrated touch sensing technology, some elements of a display device may serve multiple functions, for instance, operating the display pixels for displaying images as well as operating the touch sensor to identify user inputs on or near the display. For example, some integrated circuit (IC) may be configured to provide signals for operating the display pixels as well as the signals necessary for sensing user inputs. Similarly, some conductive lines/electrodes may be used for operating the display pixels at certain times and also used for sensing user inputs at other times. By using such multi-purpose elements, display devices may have thinner and lighter profile with improve optical performance.

Accordingly, embodiments of the present disclosure includes a common electrode for operating the display pixels is segmented into a plurality of common electrode blocks, in which at least some of them serve as touch driving blocks and touch sensing blocks to identify touch inputs. A common voltage signal is provided on the common electrodes during a display period. During a touch sensing period, however, some of the common electrodes are provided with driving signals while some other common electrodes are provided with sensing signals. Accordingly, changes in mutual capacitances generated between the touch driving blocks and the touch sensing blocks can be measured to identify user inputs.

The display device includes a plurality of touch driving channels (TX channels) and a plurality of touch sensing channels (RX channels). A TX channel is defined by electrically connecting a plurality of touch driving blocks arranged in one direction. A group of touch driving blocks arranged from one side of the display device to the opposite side can be electrically connected to each other via a plurality of conducting lines that extends perpendicular to the direction in which the group of touch driving blocks are arranged. Likewise, a plurality of conductive lines connected to touch sensing blocks extends parallel to the conductive lines routed from the touch driving blocks.

The embodiments of the present disclosure have the pixel electrode layer positioned above the common electrode layer. The conductive lines from the touch driving blocks and the touch sensing blocks are positioned in a plane level above the source/drain layer on the substrate and below the pixel electrode layer and common electrode layer. The conductive lines from the touch driving blocks and the touch sensing blocks are positioned within a dielectric layer formed between the source/drain layer and the common electrode layer formed on the surface of the dielectric layer. The conductive lines within the dielectric layer are connected to the respective touch driving blocks and touch sensing blocks via contact holes through the dielectric layer. The conductive lines within the dielectric layer are individually routed straight to the inactive area of the panel and selectively connected to define TX channels in the active area. The dielectric layer where the conductive lines are placed may be formed of photo-acrylic material.

The improved configuration would enable more accurate touch even at the edges of the display. Also, the improved configuration allows to decrease unwanted load on the touch driving electrode (Tx), but increase the Cstg. Further, the improved configuration can help suppress the light leakage issue caused by fringe field generated between the electrodes. Moreover, the improved configuration can help suppress the color mixing.

It is to be understood that both the foregoing general description and the following detailed description of the present invention are exemplary and explanatory and are intended to provide further explanation of the invention as claimed.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The following description includes embodiments described in the context of LCDs, in particular an In-Plane-Switching (IPS) mode LCD and/or a Fringe-Field-Switching (FFS) mode LCD, in which the touch driving blocks and touch sensing blocks (e.g., common electrodes) are formed on a lower substrate together with pixel electrodes. However, it should be appreciated that the features described in the present disclosure may be applied to organic light emitting diode (OLED) displays, electrophoretic displays, field emission displays and various other types of display devices.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the structures to a particular direction or a particular coordinate system.

It should be noted that the term "lines" is a sometimes used herein to mean simply conductive pathways, as one skilled in the art will readily understand, and is not limited to structures that are strictly linear, but includes pathways that change direction, and includes pathways of different size, shape, materials, etc.

Furthermore, although specific materials and types of materials may be included in the descriptions of example embodiments, one skilled in the art will understand that other materials that achieve the same function can be used. For example, it should be understood that a "conductive layer" as described in the examples below can be a layer and a stack of layers formed of any electrically conductive material such as a metal, a carbon based material, a composite conductive material and the like.

Figure 1A:
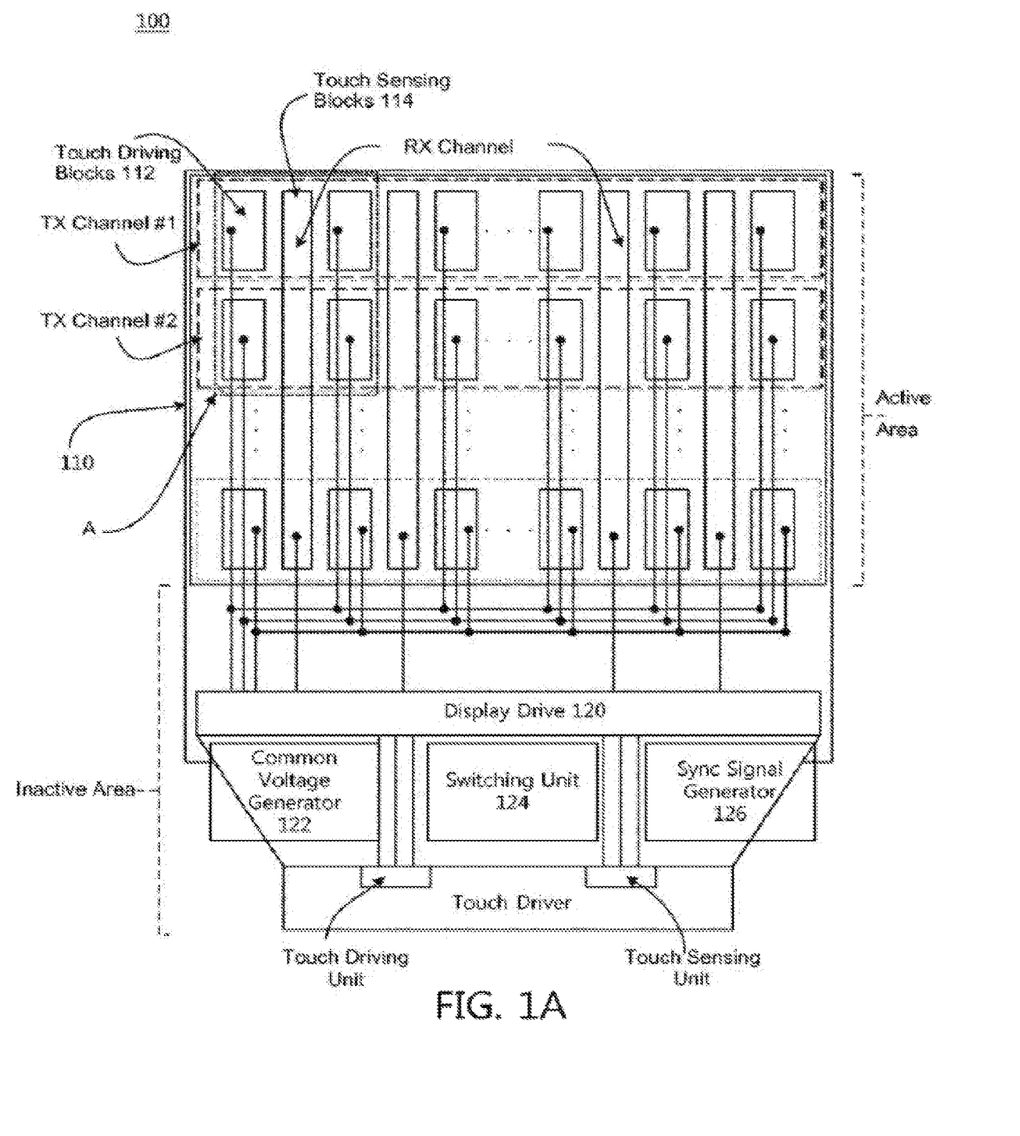
FIG. 1A illustrates an exemplary touch sensor integrated display according to an embodiment of the disclosure.

FIG. 1A is a diagram schematically illustrating a configuration of a display device 100 with an integrated touch screen according to an embodiment of the present invention. Referring to FIG. 1A, the touch sensor integrated display device 100 includes a panel 110, a display-drive-IC DDI 120, and a touch-drive-IC TDI. At least some elements of a touch sensor are built in an active area of the panel 110 where the pixels of the display device 100 are located. In the active area, a common electrode is divided into a plurality of common electrode blocks. Some of these common electrode blocks are defined as touch driving blocks 112 and touch sensing blocks 114, and are arranged to identify touch inputs on the display device 100. Accordingly, the active area including the display pixels also serve as the touch sensor enabled area of the panel. The area outside the active area is referred to as inactive areas of the panel 110.

In the panel 110, the touch driving blocks 112 and the touch sensing blocks 114 serve as the electrodes for operating the pixels to display images during a display period. During a touch scanning period, however, the touch driving blocks 112 and the touch sensing blocks 114 collectively serve as the touch sensor of the display device 100. In other words, the touch driving blocks 112 and the touch sensing blocks 114 perform both a display function and a touch function by using the signals provided from the display-drive IC 120 (DDI) and the touch drive IC (TDI).

The DDI 120 transmits various display control signals, for example, a gate signal, a common voltage signal and a data signal, to operate display pixels in the active area. Accordingly, a gate driver for applying scan signals to the gate lines and a data driver for applying a plurality of image data signals to the data lines may be included in the DDI 120. The TDI generates the touch driving voltage to apply the touch driving voltage to the DDI 120, and receives the touch sensing signal from the DDI 120 to detect touch inputs in the active area of the panel 110. The TDI may be a separate circuit, which is connected to the DDI 120 through a flexible printed circuit board. In some other embodiments, however, the TDI may be a part of the DDI 120.

The DDI 120 can configure at least some of the common electrode blocks for touch sensing by, for example, cutting off the common voltage signal and providing touch control signals from the TDI. Accordingly, the DDI 120 may further include a variety of sub-components, including but not limited to, a common voltage generator 122, a switching unit 124 and a sync signal generator 126.

The common voltage generator 122 generates the common voltage that is applied to the common electrode blocks of the panel 110. The switching unit 124 connects the groups of touch driving blocks 112 and touch sensing blocks 114 to the common voltage generator 122 or to the TDI based on the sync signal from the sync signal generator 126. Accordingly, the DDI 120 can apply the common voltage and the touch control signals to the touch driving blocks 112 and the touch sensing blocks 114 at appropriate timing.

In way of example, upon receiving a sync signal indicating the display period, the switching unit 124 allows the common voltage from the common voltage generator 122 to be provided on the touch driving lines 112 and the touch sensing blocks 114. Accordingly, during each display periods, the DDI 120 applies the common voltage to the touch driving blocks 112 and the touch sensing blocks 114 so that they serve as the common electrodes for controlling the LC molecules.

When the sync signal indicating the touch scanning period is provided to the switching unit 124, the switching unit 124 is configured so that the common voltage is no longer provided on the touch driving blocks 112 and the touch sensing blocks 114. Instead, the switching unit 124 is configured such that the touch control signals from the TDI is provided on the touch driving blocks 112 and the touch sensing blocks 114.

During the touch scanning period, a group of touch driving blocks 112 can operate together as a touch driving electrode, which may be referred to as a "TX channel." Also, one or a group of touch sensing blocks 114 can operate as a touch sensing channel, which may be referred to as a "RX channel." The number of TX channel and the RX channel in the panel 110 may depend on the desired resolution of touch sensitivity.

The switching unit 124 is connected to a touch driving unit (transmitter) 132 and a touch sensing unit (receiver) 134 of the touch IC. Therefore, when a sync signal indicative of touch scanning period is provided to the switching unit 124, a touch driving voltage generated by the touch driving unit of the TDI is applied to the TX channels. That is, the DDI 120 provides a pulse type touch driving voltage to the TX channels in order for a mutual capacitance to be generated between the TX channels and the RX channels. With the driving voltage applied to the TX channels, the DDI 120 receives a touch sensing signal, corresponding to the change of a mutual capacitance that occurs due to the touch, from RX channel with a direct current (DC) voltage applied thereto. Such touch sensing signals are applied to the touch sensing unit 134 of the TDI.

It should be noted that the common voltage generator 122, the switching unit 124 and the sync signal generator 126 may be the components included in the DDI 120, or may be discrete components and operate according to a controller of the DDI 120. Also, these components may communicate directly with the TDI and control the operation of the TDI. Also, a switching function for accommodating negative common voltage can be built in the DDI 120 so that the TDI can provide and thus addresses this limitation, and moreover, by using the existing touch IC without manufacturing a separate touch IC, the manufacturing cost can be saved.

In the example shown in FIG. 1A, each of the TX channel was defined by a group of touch driving blocks 112 arranged in a row direction (X-Axis), and each of the RX channel was defined by a single touch sensing block 114 having a rectangular shape extending in a column direction (Y-Axis). However, the arrangement of the touch driving blocks 112 and the touch sensing blocks 114 is not limited as such, and may be arranged in a various other ways depending on the desired layout of the TX and RX channels in the panel 110. While all of the touch driving blocks 112 in a single row forms a single TX channel, the number of touch driving blocks 112 for a single TX channel can vary depending on the desired touch scanning frequency and accuracy. Multiple TX channels can be defined in a single row by the respective number of groups of touch driving blocks 112.

While a single common electrode block extending vertically across the active area is used to define a RX channel in FIG. 1A, a plurality of common electrodes blocks arranged in a column direction can be used to define a single RX channel in other embodiments. Further, a plurality of common electrodes arranged in a column direction may define more than one RX channels in a single column.

Figure 1B:
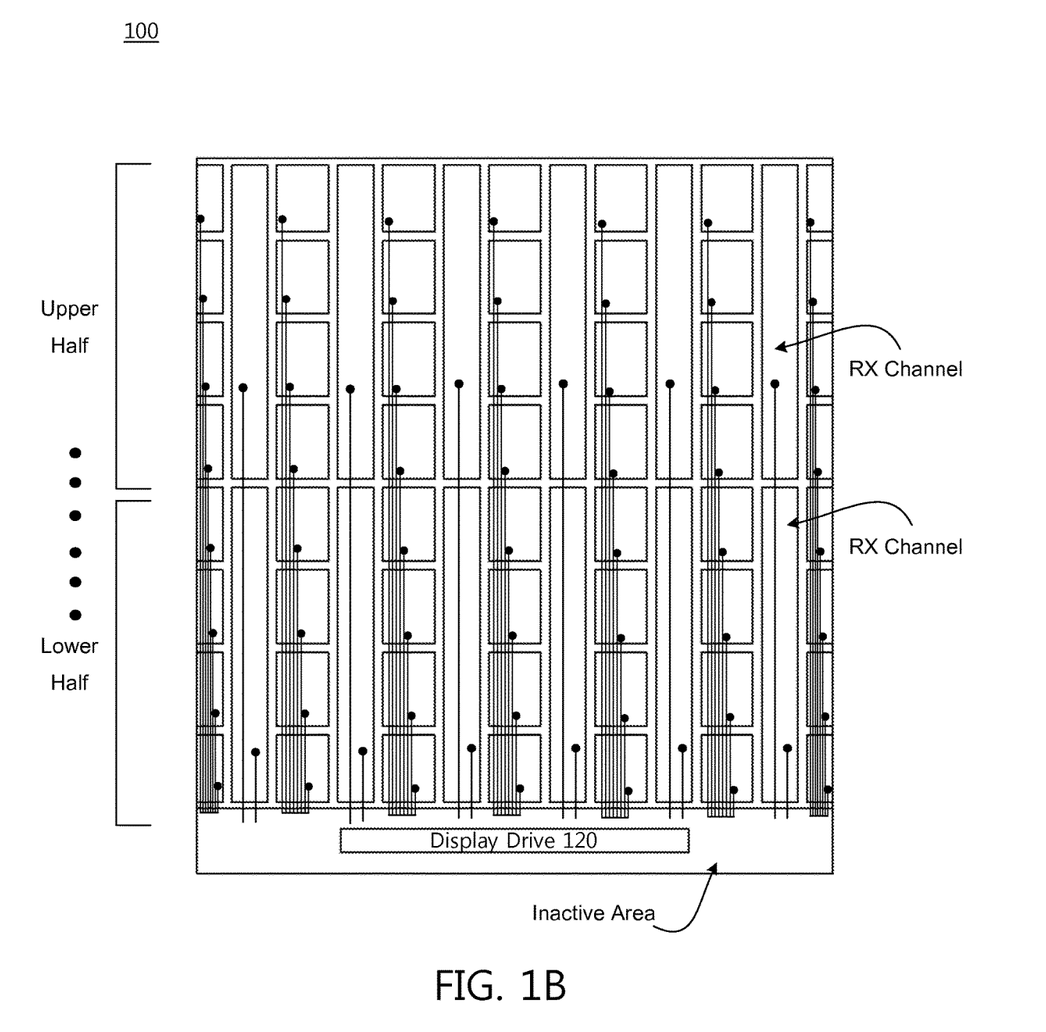
FIG. 1B is a schematic illustration of an exemplary touch sensor integrated display device having two touch sensing channels arranged in a single column according to an embodiment of the disclosure.

For instance, the number of RX channels in the panel 110 can be doubled when two RX channels are provided in a column as illustrated in FIG. 1B. In such a configuration, the upper half of the panel 110 can operate independently from the lower half of the panel 110 by using the TX/RX channels at the upper half of the panel 110. The TX channels coupled to the RX channels in the upper half of the panel 110 and the TX channels coupled to the RX channels in the lower half of the panel 110 can operate simultaneously for faster touch scanning operation. If desired, additional touch scanning areas can be created by providing additional RX channels in the column direction. The increase in the number of RX channels in a single column requires additional sensing signal lines 1311 to be routed across the touch sensing blocks 114 in the active area to the inactive area. Additional routings may be needed in the inactive area as well. As such, the number of RX channels may be limited by the available space and the number of pin provided by the DDI 120 and/or the TDI 130 in the inactive area.

Figure 1C:
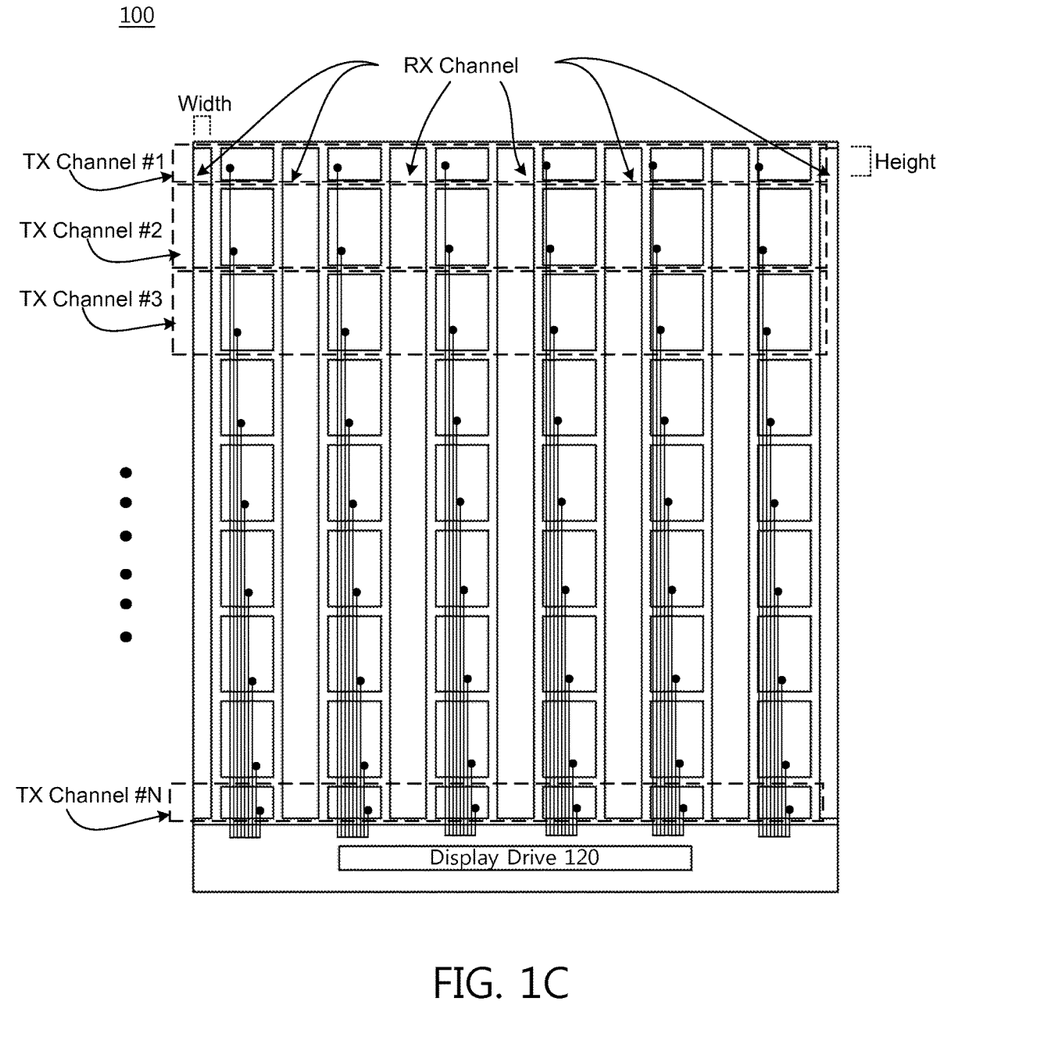
FIG. 1C is a schematic illustration of an exemplary touch sensor integrated display device having the first and last touch sensing channels arranged at two side edges of the active area according to an embodiment of the disclosure.

In order to improve the touch sensing capability and accuracy at the edge of the panel 110, the common electrode blocks at the farthest ends of the two side edges of the active area (i.e., left and right ends) may be configured as the touch sensing blocks 114 as illustrated in FIG. 1C. This way, touch inputs made by the object with very small touch point (e.g., 2.5Φ) can be recognized at the edges of the panel 110.

To further improve the performance of the touch sensing capability, the width of the touch sensing blocks 114 forming the RX channels at the edges may be different from the width of other touch sensing blocks 114 in the other areas of the panel 110. Configuring the farthest edges as the RX channel allows to read touch signals even from the edges of the panel 110. However, the touch driving blocks 112 will shift away from the edges by the width of the RX channels at the edges, and this may defeat the purpose of having the RX channels at the edges in the first place. Also, the touch driving blocks 112 will be positioned only at one side of the RX channels at the edges. Accordingly, the width of the touch sensing blocks 114 at the edges may be narrower than the width of the touch sensing blocks 114 at other areas of the panel 110. On the other hand, the RX channels should be sufficiently wide to recognize the touch signals. For the reasons discussed above, the width of the touch sensing blocks 114 at the edges of the panel 110 may be ½ of the touch sensing blocks 114 positioned at other areas of the panel 110.

To improve the touch sensing accuracy at the upper and lower edges of the panel 110, the touch driving blocks 112 at the upper and lower edges of the panel 110 can have a reduced height in comparison to the other touch driving blocks 112 at other areas of the panel 110. This way, narrower TX channels can be provided at the top and bottom edges of the panel 110. The number of TX and RX channels in the panel 110 can be adjusted according to the arrangement and adjustment in sizes (i.e., width and height) of the common electrode blocks in the active area.

Touch driving signals and touch sensing signals can be provided to the touch driving blocks 112 and the touch sensing blocks 114 via a plurality of conductive lines 130. Among the conductive lines 130, ones that provide touch driving signals to the touch driving blocks 112 are referred to as the driving signal lines 132. Also, one that provide touch sensing signals to the touch sensing blocks 114 are referred to as the sensing signal lines 134.

Each touch driving blocks 112 of a group that operates as one TX channel is connected with a discrete driving signal line 132. The individual driving signal lines 132 from the respective touch driving blocks 112 are arranged parallel to each other and extend towards the same inactive area in the panel 110. That is, all of the driving signal lines 132 from the respective touch driving blocks 112 are routed straight to the inactive area positioned at one side of the panel 110. Preferably, the inactive area where the touch driving lines 132 are routed to has the DDI 120 positioned therein, or positioned towards the DDI 120. This way, the routing of the touch driving lines 132 within or from the inactive area to the DDI 120 can be minimized.

Similar to the driving signal lines 132, each of the sensing signal lines 134 from the corresponding touch sensing blocks 114 are arranged to extend towards the same inactive area of the panel 110. The individual sensing signal lines 134 may be oriented parallel to each other. The sensing signal lines 134 may be routed to the same inactive area as the driving signal lines 132. In this case, the sensing signal lines 134 may also be running parallel to the driving signal lines 132.

Figure 2:
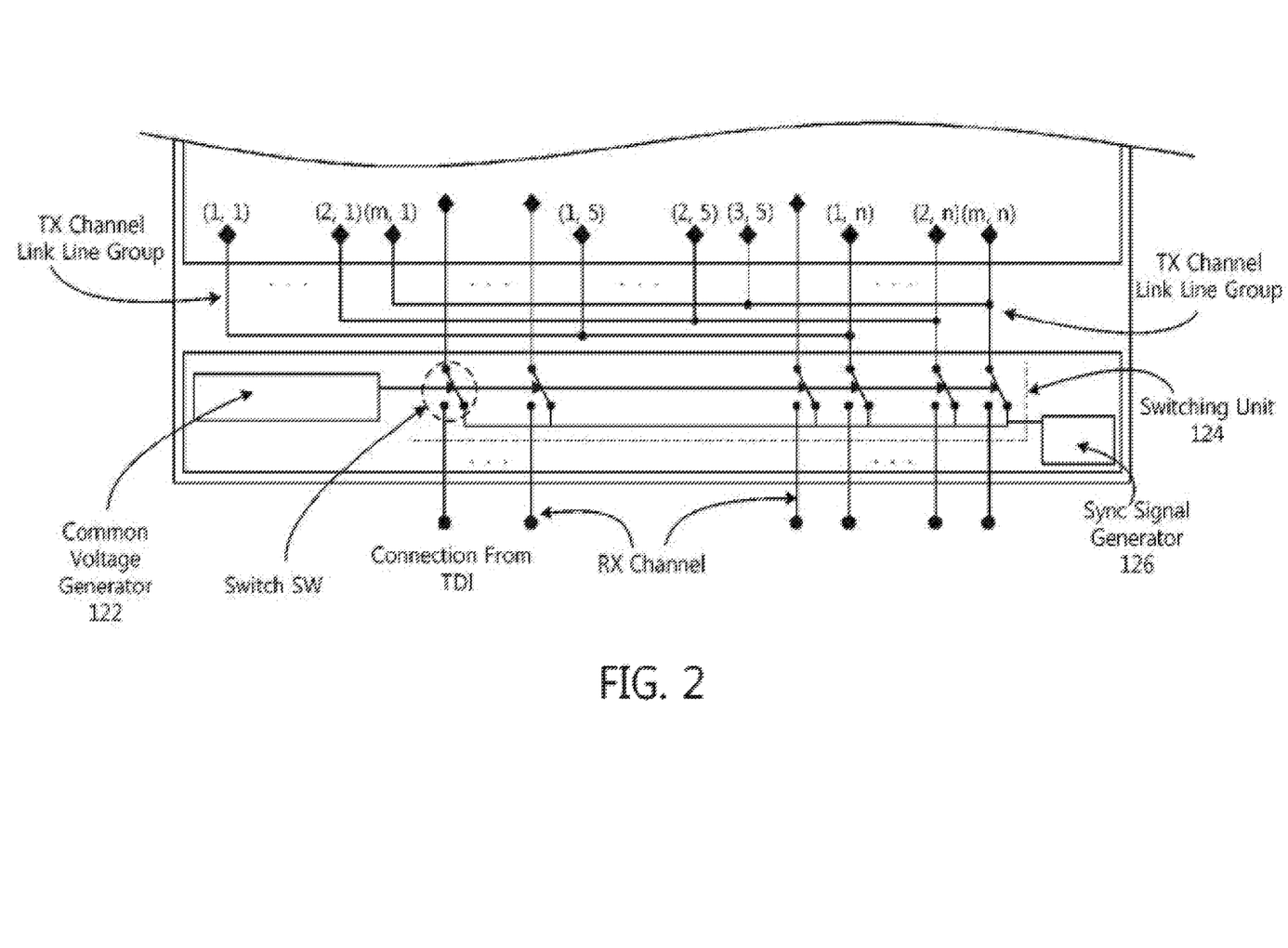
FIG. 2 illustrates an exemplary configuration of conductive lines in the inactive area of the display device to control touch driving channels and sensing channels of a touch sensor integrated display according to an embodiment of the disclosure.

FIG. 2 illustrates an exemplary configuration of the driving signal lines 132 and the sensing signal lines 134 in the inactive area of the panel. As mentioned above, the driving signal lines 132 are electrically connected together in the outside of the active area. In other words, the driving signal lines 132 routed separately to the inactive area, and are selectively grouped together within the inactive area to create TX channels of the active area. This grouping of the driving signal lines 132 within the inactive area of the panel 110 electrically connects the respective touch driving blocks 112 to collectively serve as a TX channel in the active area.

The grouping of the driving signal lines 132 can be accomplished by routing the driving signal lines 132 to a single conductive member or a link line positioned in the inactive area. In some embodiments, the driving signal lines 132 can be routed to the DDI 120, and the grouping of the driving signal lines 132 can be achieved inside the DDI 120. In some other embodiments, the grouping of the driving signal lines 132 can be made within a link area outside the DDI 120.

In FIG. 2, each driving signal line 132 routed from the active area is denoted with two numbers. The first number in the bracket indicates the TX channel in which the driving signal line 132 and the corresponding touch driving block 112 belongs to. The second number of the bracket indicates the order in which the driving signal line 132 and the corresponding touch driving block 112 within the respective TX channel. In this example, the individual driving signal lines 132 from the touch driving blocks 112 of the first row are grouped together. That is, the driving signal lines 132 denoted with (1,1), (1,2) to (1,n) are grouped together by a link line. The "n" is an integer, which indicating the number of touch driving blocks 112 of the first TX channel. The second group, which is the second TX channel in the active area of the panel 110, is implemented in the similar fashion as the first group by a separate link line. There may be "m" number of groups of driving signal lines 132, resulting in "m" number of TX channels in the active area of the panel 110. Each link line for electrically connecting the driving signal lines 132 in the inactive area is also connected to the DDI 120. In this way, the DDI 120 can provide a touch driving signal simultaneously to the group of touch driving blocks 112 of a TX channel.

When a single RX channel is implemented with a single common electrode block, only one sensing signal line 134 is needed per RX channel. In embodiments where a single RX channel is implemented with two or more touch sensing blocks 114, the sensing signal lines 134 connected to the touch sensing blocks 114 of the corresponding RX channel can be individually extended out to the inactive area in the similar fashion as the driving signal lines 132. The sensing signal lines 134 can be grouped together in the inactive area of the panel 110 so that the respective touch sensing blocks 114 collectively form a single RX channel in the active area extending in Y-axis.

As briefly discussed above in reference to FIG. 1B, multiple touch sensing blocks 114 can be arranged in a column direction. The touch sensing blocks 114 positioned in the upper half of the active area can serve as the upper RX channels for the upper half of the panel 110, while the touch sensing blocks 114 positioned in the lower half of the active area can serve as the lower RX channels of the lower half of the panel 110. This configuration allows simultaneous driving of the TX channels in the upper half of the panel 110 and the lower half of the panel 110. In such configuration, the sensing signal line 134 routed from the upper RX channel should not be grouped together with the sensing signal line 134 routed from the lower RX channel.

If desired, the touch sensing functionality can be selectively activated for the upper and lower half of the panel 110. For instance, touch control signals to the TX/RX channels in the upper half and lower half of the panel 110 can be provided at different periods or provided from different source (e.g., different TDI). As such, the grouping of the sensing signal lines 134 should be made accordingly so that appropriate number of RX channels can be provided from the number of common electrode blocks arranged in column direction.

The switching unit 124 includes a plurality of switches SW. The number of switches SW in the switching unit 124 may be equal to or more than the number of TX/RX channels in the panel 110. Some of the switches SW are connected to a link line having a group of driving signal lines 132 connected thereto. Each sensing signal line 134 may be connected to an individual switch SW. In some cases, each link line connecting a group of sensing signal lines 134 for a single RX channel can be connected to one switch SW of the switching unit 124. In such configurations, each of the TX channels and the RX channels are connected to an individual switch SW, and the number of switches SW included in the switching unit 124 may vary depending on the number of TX/RX channels of the panel 110. In order to provide high frequency driving and sensing of the TX/RX channels in the panel 110, the switching unit 124 may include two or more multiplexers, and each link line in the inactive area forming a TX channel may be connected to the extra multiplexer of the switching unit 124.

Figure 3:
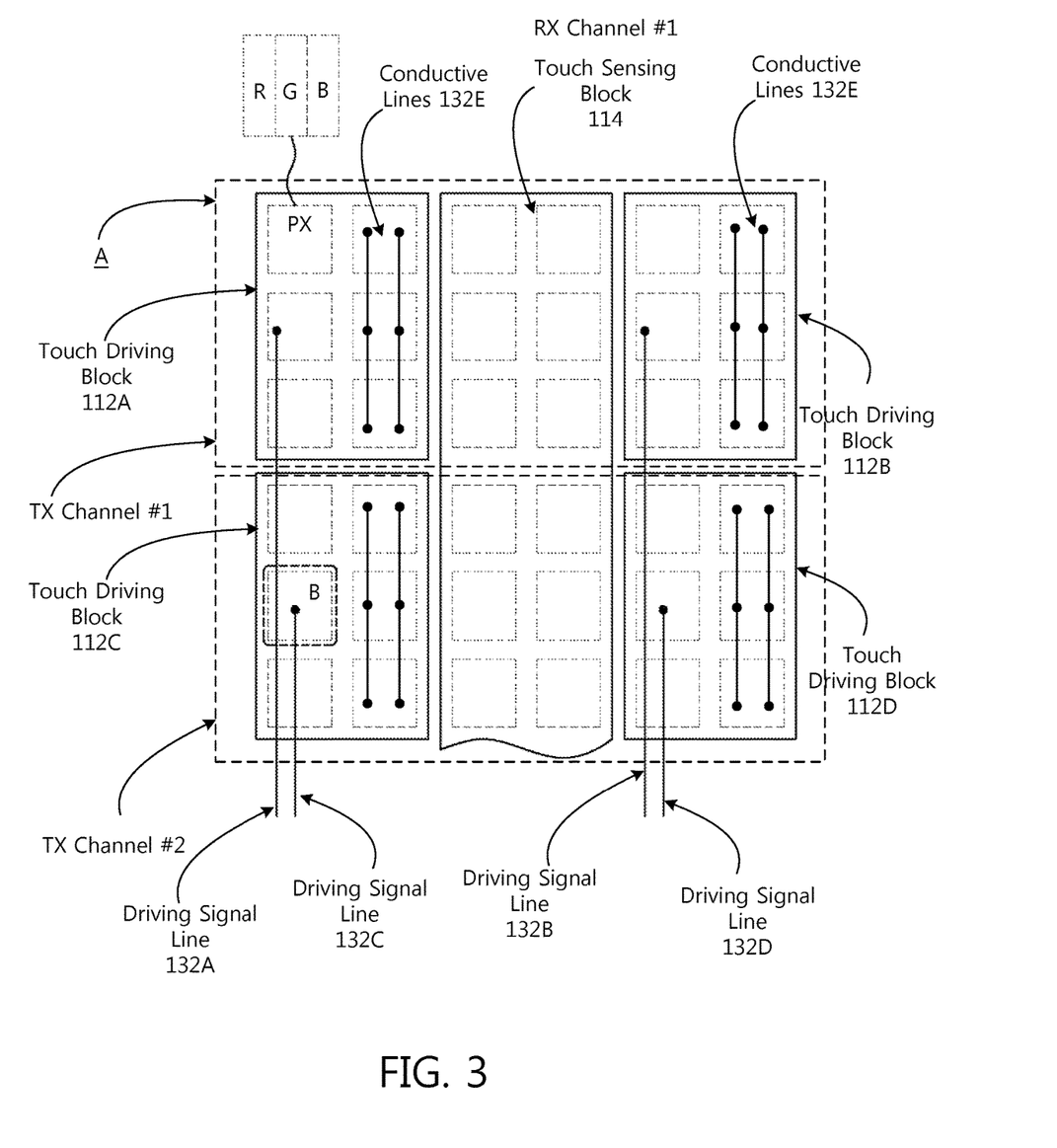
FIG. 3 illustrates another exemplary configuration of common electrode blocks and conductive lines at area denoted "A" in FIG. 1A according to embodiments of the disclosure.

FIG. 3 is an enlarged planar view of an area "A" in FIG. 1A, illustrating the arrangement of the conductive lines 130 in the active area of the panel 110. The touch driving blocks 112A and 112B are included in the group of touch driving blocks 112 operating as the TX channel #1 and the touch driving blocks 112C and 112D are included in the group of touch driving blocks 112 operating as the TX channel #2. Also, a touch sensing block 114 is positioned such the touch driving blocks 112A and 112C are on one side of the touch sensing block 114 and the touch driving blocks 112B and 112D are on the opposite side of the touch sensing block 114. The touch sensing block 114 operates as the RX channel #1.

The sizes of the TX channel and RX channel may vary depending on the size of the individual display pixels, spacing between the display pixels as well as the number of display pixels to be controlled by the each common electrode block. Further, the size of the intended objects for entering the touch inputs (e.g., finger, stylus, etc.) and/or the additional functionalities to be performed by the common electrode blocks may also be considered in determining the appropriate sizes of the touch driving blocks 112 and the touch sensing blocks 114.

In this particular example, size display pixels are illustrated as being formed in each touch driving block 112 for convenience. However, it should be appreciated that the number of display pixels under touch driving blocks 112 and the touch sensing blocks 114 are not limited as depicted here. Also, each display pixel is segmented into three sub-pixel areas SP1 to SP3, but it should be appreciated that configuration of sub-pixels can vary in other embodiments. For instance, the display pixel may be segmented into four sub-pixel areas, including a red, a green, a blue and a white.

As shown in FIG. 3, a driving signal line 132 is routed from each touch driving blocks 112 towards the bottom where the inactive area is located. The driving signal line 132A from the touch driving block 112A extends parallel to the driving signal line 132C from the touch driving block 112C. Since the touch driving blocks 112A and 112B are included in the same TX channel #1, the driving signal lines 132A and 132B should be connected to each other once they are routed into the inactive area. Similarly, the driving signal lines 132C and 132D should be grouped together with other driving signal lines forming the TX channel #2. Since all of the driving signal lines are routed straight to the inactive area in parallel to each other, the driving signal lines 132A and 132B of the TX channel #1 cross over the touch driving blocks 112C and 112D of the TX channel #2. It should be noted that other driving signal lines 132 from other touch driving blocks 112 are also in the same manner.

The sensing signal line 134 from the RX channel may be routed to the inactive area from the part of the touch sensing block 114 located near the inactive area. Accordingly, the sensing signal line 134 from the RX channel #1 is not depicted in this drawing as this particular section of the panel 110 is the top-left corner of the panel 110. In the embodiments where multiple RX channels are provided in a column direction, sensing signal lines 134 would be extending across the touch sensing block(s) 114 of other RX channels in the respective column.

There are additional conductive lines 130 disposed in in the touch driving blocks 112, which extend parallel to the driving signal lines 132A, 132B, 132C and 132D. These conductive lines are arranged such that they do not extend over the boundary of their respective touch driving block 112. The extra conductive lines 130 may be in contact with the corresponding touch driving blocks by a number of contact holes along the conductive lines 130 to lower the electrical resistance of the touch driving blocks 112. Such extra conductive lines 130 may be positioned to overlap the data line formed on the panel 110 to minimize the possible effects on the aperture ratio of the pixel by the extra conductive lines 130. Although not depicted in FIG. 4, the extra conductive lines 130 may also be disposed in the touch sensing block 134 in the similar fashion.

As discussed above, the individual driving signal lines 132 from the respective touch driving blocks 112 are extended out to the inactive area. Likewise, the sensing signal lines 134 from the respective touch sensing blocks 114 may be extend to the inactive area. In the active area of the panel 110, the driving signal lines 132 may be extended parallel to the data lines formed on the panel 110. By overlaying the driving signal lines 132 on the data lines, any possible reduction in the transmittance of the panel 110 due to routing of the driving signal lines 132 across the active area can be minimized. Because the driving signal lines 132 can be routed directly across the active area of the panel 110, the size of the inactive area in the two side ends of the panel 110 can be reduced as well.

The driving signal lines 132 may be formed to overlay the data lines with one or more passivation layer therebetween. The touch driving blocks 112 and the driving signal lines 132 are separated by one or more organic passivation layers. That is, the touch driving blocks 112 are formed in a layer above the layer in which the driving signal lines 132 are formed. Accordingly, the connections between the driving signal lines 132 and the respective touch driving blocks 112 are made by a contact hole through the passivation layer.

Figure 4:
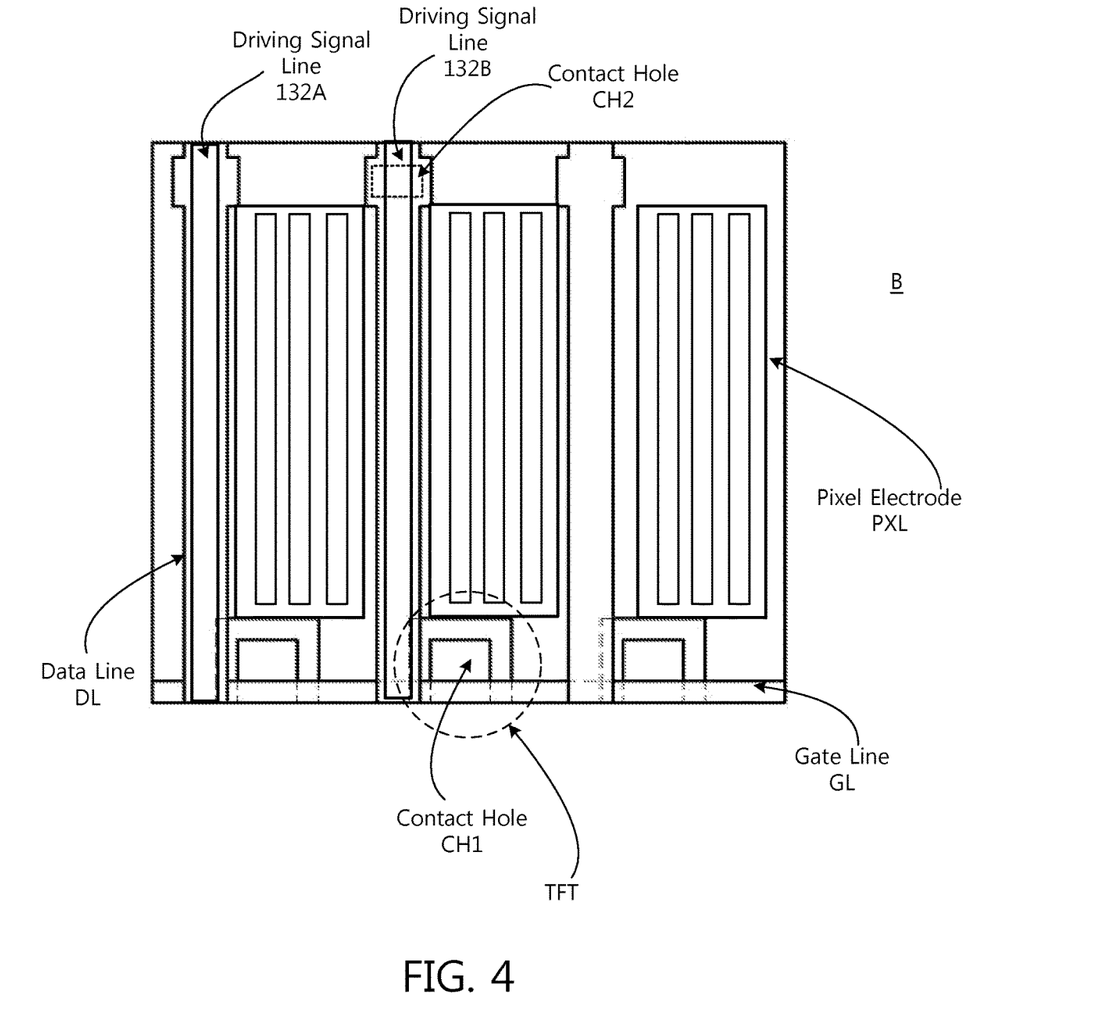
FIG. 4 illustrates another exemplary configuration of common electrode blocks and conductive lines at area denoted "B" in FIG. 3 according to embodiments of the disclosure.

FIG. 4 is an enlarged view illustrating an exemplary configuration of a display pixel denoted as "B" in FIG. 3. In this example, three sub-pixels are included in a display pixel. Each sub-pixel includes a pixel electrode PXL in an area defined by a data line DL extending in Y-axis and a gate line GL extending in X-axis. A thin-film-transistor (TFT) is formed at the intersections of the data lines DL and the gate lines GL. Each TFT is configured with a gate, a source electrode, a drain electrode and a semiconductor layer. The gate is extended from, or otherwise connected to the gate line GL. The source electrode is extended from, or otherwise connected to the corresponding data line DL. The drain electrode is connected to the corresponding pixel electrode PXL through a contact hole CH1. The pixel electrode PXL has a plurality of slits at a certain interval. With the slits in the pixel electrode PXL, fringe field is generated between the pixel electrode PXL and the common electrode block (i.e., touch driving block 112) to operate the display device 100 in the fringe field switching mode.

A plurality of conductive lines 130 aligned parallel to the data line DL is extended towards the inactive area. As described above, each touch driving block 112 is connected with a driving signal line 132, which is routed to the inactive area of the panel 110 to be grouped with other driving signal lines 132 of the same TX channel. In routing the driving signal lines 132 between the corresponding touch driving block 112 and the inactive area of the panel 110, the driving signal lines 132 simply pass through the touch driving blocks 112 of the other TX channel. In FIG. 4, two driving signal lines 132A and 132B are routed to the inactive area. However, only the driving signal lines 132B is connected to the touch driving block 112 shown here through the contact hole CH2. The driving signal line 132A simply bypasses the touch driving block shown 112 without any contact thereto. Although not shown in FIG. 4, the driving signal line 132A may be in contact with the touch driving block 112 of the first TX channel #1.

In FIG. 4, the driving signal lines 132B may not extend further into the touch driving blocks 112 past the one that is connected through the contact hole CH2. In some embodiments, however, the driving signal line 132B may extends further up, crossing over the touch driving block 112, which is connected with the driving signal line 132B through the contact hole CH2. FIG. 4 shows an exemplary configuration of conductive lines 130 used as the driving signal lines 132 within a touch driving block 112. However, the configuration described above is equally applicable for the sensing signal lines 134 in the touch sensing blocks 114.

Figure 5A:
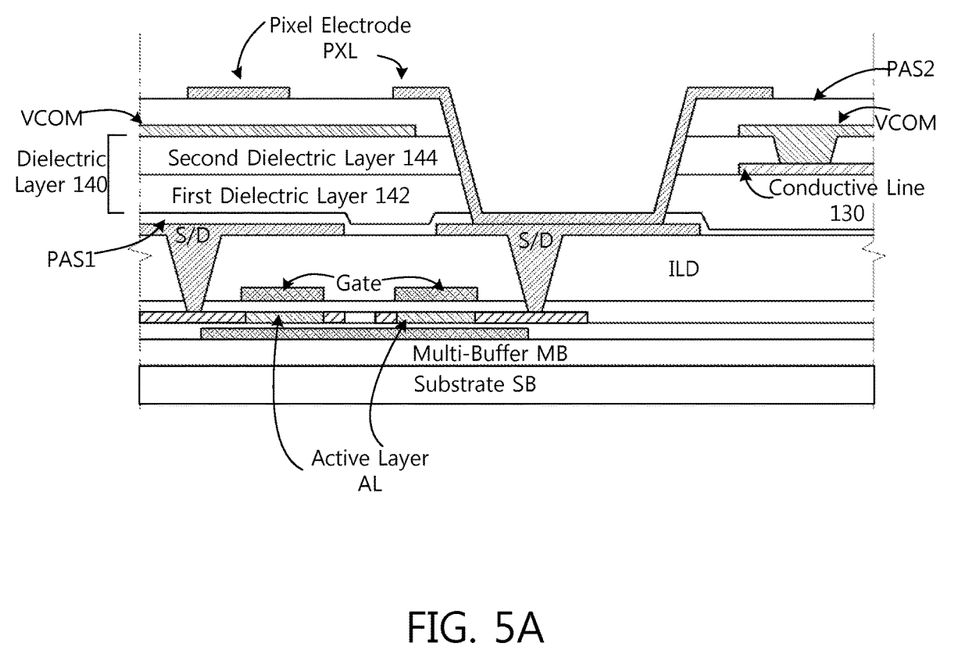
FIGS. 5A and 5B illustrate cross-sectional views of showing exemplary configurations of conductive lines, organic dielectric layers, common electrode blocks and pixel electrodes according to an embodiment of the disclosure.

FIG. 5A is a cross-sectional view illustrating an exemplary configuration of a sub-pixel area including the conductive line 130. A TFT may be disposed on a buffer layer MB, which is formed on the substrate SB of the panel 110. The TFT may be a coplanar type TFT using a poly-silicon semiconductor layer as the active layer AL. As shown, the TFT may have dual gate structure with two gates formed on the gate insulation layer GI, interposed between the semiconductor layer AL and the gates. An interlayer dielectric ILD is formed over the gates, and the source/drain electrodes are formed on the ILD. The source/drain electrodes are in contact with the semiconductor layer via the contact holes through the ILD. The source electrode of the TFT serves as the data line DL, and the drain electrode of the TFT is connected to the pixel electrode PXL.

As shown in FIG. 5A, an inorganic passivation layer PAS1 may be formed on the source/drain electrode layer of the TFT. The inorganic passivation layer PAS1 may be formed of silicon nitride (SiNx). The thickness of the inorganic passivation layer PAS1 may not be sufficient to planarize over the source/drain layer on the ILD. In order to provide a planar surface to place the common electrode VCOM, one or more organic dielectric layers can be formed on the inorganic passivation layer PAS1.

The embodiment illustrated in FIG. 5A has a pixel-top configuration. In this configuration, a passivation layer PAS2 is formed over the common electrode VCOM, and the pixel electrode PXL positioned above the passivation layer PAS2 is in contact with the data line DL through a contact hole. The part of the pixel electrode PXL above the common electrode VCOM has a plurality of slits to generate fringe field between the pixel electrode PXL and the common electrode VCOM.

As discussed above, some of the common electrodes VCOM can serve as the touch driving blocks 112 or the touch sensing blocks 114 by the touch control signals transmitted via the driving signal lines 132 and the sensing signal lines 134, respectively. Although the touch driving blocks 112 and the touch sensing blocks 114 are differentiated based on their functionality during the touch scanning periods, they are part of the common electrodes formed at the same plane level using the same material (e.g., indium-tin-oxide; ITO).

Similarly, the differentiation between the driving signal lines 132 and the sensing signal lines 134 may also be simply based on their functionality during the touch scanning period. Accordingly, some of the plurality of conductive lines 130, which is formed of the same material at the same plane level, serve as the driving signal lines 132 and the sensing signal lines 134 during the touch scanning period. The plurality of conductive lines 130 can be arranged parallel to each other on the same plane level, and some of these conductive lines 130 can be connected to the appropriate common electrode blocks to serve as the driving signal lines 132 or the sensing signal line 134. It should be noted that some of the conductive lines 130 may serve as neither the driving signal lines 132 nor the sensing signal lines 134, and exist in the panel for various other reasons, for instance to reduce the resistance of the common electrode blocks.

As described above, the conductive lines 130 serving as the driving signal lines 132 and the sensing signal lines 134 are arranged parallel to the data line and routed towards the inactive area, crossing through the active area of the panel 110. By routing the conductive lines 130 directly across the active area, the size of the inactive area at the side of the panel 110 can be reduced.

In the pixel-top configuration, the conductive lines 130 and the common electrode VCOM must be positioned at a different plane level. Also, the conductive lines 130 cannot be positioned in the same plane level as the pixel electrode PXL nor as the S/D layer because the touch driving voltage during the touch scanning period would cause various display defects. Furthermore, the conductive lines 130 cannot be positioned immediately above or below the common electrode VCOM to directly interface with the surface of the common electrode VCOM. In such a configuration, the conductive lines 130 will be in contact with the touch driving blocks 112 along path towards the inactive area, thereby shorting the multiple TX channels in the active area of the panel 110. Thus, in order to route the conductive lines 130 across the active area of the panel 110, the plane level of the conductive lines 130 should be above the plane level of the S/D layer, while being under the plane levels of both the pixel electrode PXL and the common electrode VCOM.

Accordingly, in the embodiment shown in FIG. 5A, the conductive lines 130 are positioned within a dielectric layer 140 between the S/D layer and the common electrode VCOM. The dielectric layer 140 may serve as a planarization layer for providing a surface where the common electrode VCOM is deposited thereon. To this end, the dielectric layer 140 between the S/D layer and the common electrode VCOM may be formed of an organic material such as photo-acryl (PAC) with a thickness sufficient to provide a planar surface for the common electrode VCOM to be positioned thereon.

The dielectric layer 140 between the common electrode VCOM and the S/D layer (or the PAS1 if exist above the S/D layer) may be formed in a thickness in the range of about 2 μm to about 4 μm. It should be appreciated that the thickness of the dielectric layer 140 can vary depending on various factors such as the fabrication process the material used in forming the dielectric layer 140 and most importantly the thickness of the conductive lines 130 to be placed within the dielectric layer 140.

In order for the dielectric layer 140 to have the conductive lines 130 therein, a planar surface above the S/D layer is need to place the conductive lines 130, and another planar surface over the conductive lines 130 is needed to place the common electrode VCOM. Accordingly, the conductive lines 130 can be sandwiched between at least two separately formed organic dielectric layers. To this end, the step for depositing the conductive lines 130 can be performed in between the steps process of forming one organic dielectric layer over another organic dielectric layer.

Accordingly, the conductive lines 130 is positioned above the surface of the first organic dielectric layer 142, and the common electrode VCOM is positioned on the surface planarized by the second organic dielectric layer 144 on the conductive lines 130. The thicknesses of the first organic dielectric layer 142 and the second organic dielectric layer 144 are important in at least two respects. First, the first organic dielectric layer 142 should have a thickness sufficient to provide a planar surface over the S/D layer for the conductive lines 130 to be deposited thereon. The second organic dielectric layer 144 should also have a thickness sufficient to provide a planar surface over the conductive lines 130 for the common electrode VCOM to be deposited thereon.

In another respect, the thickness of the first organic dielectric layer 142 must be sufficiently high so that the capacitance between the conductive lines 130 on the surface of the first organic dielectric layer 142 and other signal lines (e.g., data lines, gate lines) under the first organic dielectric layer 142 can be kept low. For example, the gate lines underneath the first organic dielectric layer 142 can be affected when driving the touch driving blocks 112 by the driving signal on driving signal lines 132. Such a swing on the gate lines on the panel 110 or some other conductive lines under the first organic dielectric layer 142 extending horizontally across the RX channels in the active area can throw off the readings from the RX channel.

Similarly, the thickness of the second dielectric layer 144 must also be sufficiently high so that the capacitance between the conductive lines 130 and the common electrode VCOM on the surface of the second dielectric layer 144 is kept low. More specifically, the capacitance between the conductive lines 130 and the common electrode VCOM can be undesirably high when the distance between the two layers is close. During the touch scanning period, such undesirably large capacitance between the touch driving blocks 112 and the driving signal lines 132 that bypasses those touch driving blocks 112 can results in significant noises that hinder the accurate reading of the touch signals.

With respect to providing a planar surface over the S/D layer, the thickness of the first organic dielectric layer 142 would dependent on the thickness of the S/D layer. In some embodiments, the S/D layer may be formed as a stack of multiple conductive material with a thickness ranging from about 4000 Å to about 5000 Å, and the first organic dielectric layer 142 may have a thickness in the range of about 1 µm to about 2 µm. The S/D layer may be formed as a stack of a lower molybdenum layer, an aluminum layer and an upper molybdenum layer.

Although not limited as described here, the aluminum layer, which is the layer having the lowest resistance, may be the thickest layer of the stack with a thickness ranging from about 3500 Å to about 4500 Å, and more preferably a thickness of about 4000 Å. Each of the two molybdenum layers may have a thickness of ranging from about 200 Å to about 500 Å. Considering the fabrication processes after the formation of data line 510, the upper molybdenum layer may be formed thicker (e.g., about 500 Å) than the lower molybdenum layer (e.g., about 200 Å). With the S/D layer having the thickness as described above, the first organic dielectric layer 142 of about 1 µm should be sufficient to provide a planar surface over the S/D layer.

The conductive lines 130 on the first organic dielectric layer 142 may also have a similar stack structure as the S/D layer. For instance, the driving signal lines 132 can include a lower molybdenum layer (200 Å), an aluminum layer (3000 Å) and an upper molybdenum layer (300 Å). Further, the upper molybdenum layer may be formed slightly thicker than the lower molybdenum layer. With the conductive lines 130 having a thickness in a range from about 2500 Å to about 4000 Å, the second dielectric layer 144 with a thickness of about 1 µm should be sufficient to provide a planar surface over the conductive lines 130.

In a projected capacitance type touch system, the ratio of ΔCM/CM plays an important role in terms of performance. CM denotes the mutual capacitance between a TX channel and a RX channel. Accordingly, upon a touch signal, a larger change in the CM is desired to provide more efficient and accurate touch sensor. However, a tight gap between the plane levels of the conductive lines 130 and the common electrode VCOM can results in an undesirably large capacitance between the conductive lines 130 (i.e., driving signal lines 132) and the common electrode VCOM (i.e., touch driving blocks 112) of other TX channels. Also, a tight gap between the conductive lines 130 and the S/D layer and/or the gate lines may also results in an undesirably large capacitance. Such capacitances are generally referred as coupling capacitance (Coupling CM), and are considered as noises that reduces the signal-to-noise ratio.

In the in-cell type touch system, the pure CM (i.e., CM without the noises) is about 0.3 pF. Accordingly, assuming the amount of change upon a touch is about 0.1 pF, even 1 pF of coupling CM can reduce the rate of change (ΔCM/CM) from 33% down to about 7.7%. Accordingly, the thicknesses of the first organic dielectric layer 142 and the second organic dielectric layer 144 can be adjusted further to reduce the amount of coupling CM. In some embodiments, the first organic dielectric layer 142 and the second organic dielectric layer 144 may each have a thickness of about 1.5 µm.

Following tables are provided to show the reduction in the touch load by positioning the conductive lines 130 within the organic dielectric layer 140 formed between the S/D layer and the layer of common electrode VCOM. Both tables show the amount of capacitance between the respective elements listed in the first column with respect to each of the elements listed in the first row of the table. The values in TABLE 1 is obtained from a touch sensor integrated panel configured with the common electrode VCOM positioned above the pixel electrode PXL and the touch driving/sensing lines positioned in the same layer as the pixel electrode.

TABLE 1

|  | GATE LINE | COMMON ELECTRODE VCOM | DATA LINE | CONDUCTIVE LINES XX |
|---|---|---|---|---|
| GATE LINE | 3.80E−15 | 1.19E−15 | 1.91E−15 | 6.29E−16 |
| COMMON ELECTRODE VCOM | 1.19E−15 | 3.74E−14 | 3.72E−15 | 3.24E−14 |
| DATA LINE | 1.91E−15 | 3.72E−15 | 7.62E−15 | 1.99E−15 |
| CONDUCTIVE LINES | 6.92E−16 | 3.24E−14 | 1.99E−15 | 3.51E−14 |

The values in TABLE 2 below is obtained from a touch sensor integrated panel having the pixel-top configuration with the conductive lines 130 positioned within the dielectric layer 140 between the S/D layer and the common electrode VCOM layer.

TABLE 2

|  | GATE LINE | COMMON ELECTRODE VCOM | DATA LINE | CONDUCTIVE LINES XX |
|---|---|---|---|---|
| GATE LINE | 3.83E−15 | 1.18E−15 | 1.82E−15 | 8.31E−16 |
| COMMON ELECTRODE VCOM | 1.18E−15 | 1.06E−14 | 2.81E−15 | 6.61E−15 |
| DATA LINE | 1.82E−15 | 2.81E−15 | 9.49E−15 | 4.85E−15 |
| CONDUCTIVE LINES | 8.31E−16 | 6.61E−15 | 4.85E−15 | 1.23E−14 |

Comparing the two configurations, not much difference is recognized as to the capacitance between the conductive lines 130 and gate line GL. Despite the slight increase (about 2.85 fF) in the capacitance between conductive lines 130 and the data line DL, significant reduction (about 26 fF) in the capacitance with respect to the common electrode VCOM was observed. In short, there was total of about 65% reduction in the coupling capacitance by placing the conductive lines 130 within the organic dielectric layer 140 and away from the common electrode VCOM.

There are several additional advantages in having the conductive lines 130 within the organic dielectric layer 140. In the VCOM-top configuration, the common electrode VCOM is positioned above the pixel electrode PXL and the conductive lines 130, which are positioned on the surface of the dielectric layer 140.

In the VCOM-top configuration, spacing between the layer of common electrode VCOM and the layer of pixel electrode PXL is limited by the existence of the conductive lines 130 on the same plane level as the pixel electrode PXL. That is, any reduction in the spacing between the common electrode VCOM and the pixel electrode PXL for higher storage capacitance will also result in higher coupling capacitance between the common electrode VCOM and the conductive lines 130. Also, arranging the conductive lines 130 under the split area of the common electrode VCOM for lowering the coupling capacitance can generates unwanted fringe field between the common electrode VCOM and the conductive lines 130. This fringe field affects the LC molecules, leading to undesired light leakage in the panel 110.

In the embodiments disclosed in the present disclosure with the conductive lines 130 placed within the dielectric layer 140, the inorganic passivation layer PAS2 between the pixel electrode PXL and the common electrode VCOM can be kept low. For instance, the PAS2 can be kept at or even lower than 3150 Å. This, in turn, enables to provide increased storage capacitance. The conductive lines 130 can be spaced farther away from the common electrode VCOM by reducing the thickness of the first organic dielectric layer 142, thereby reducing the unwanted load on the driving signal lines 132 and sensing signal lines 134. By adjusting the thickness of the first organic dielectric layer 142, coupling capacitance between the conductive lines 130 and the signal lines under the first organic dielectric layer 142 can be reduced as well.

Figure 5B:
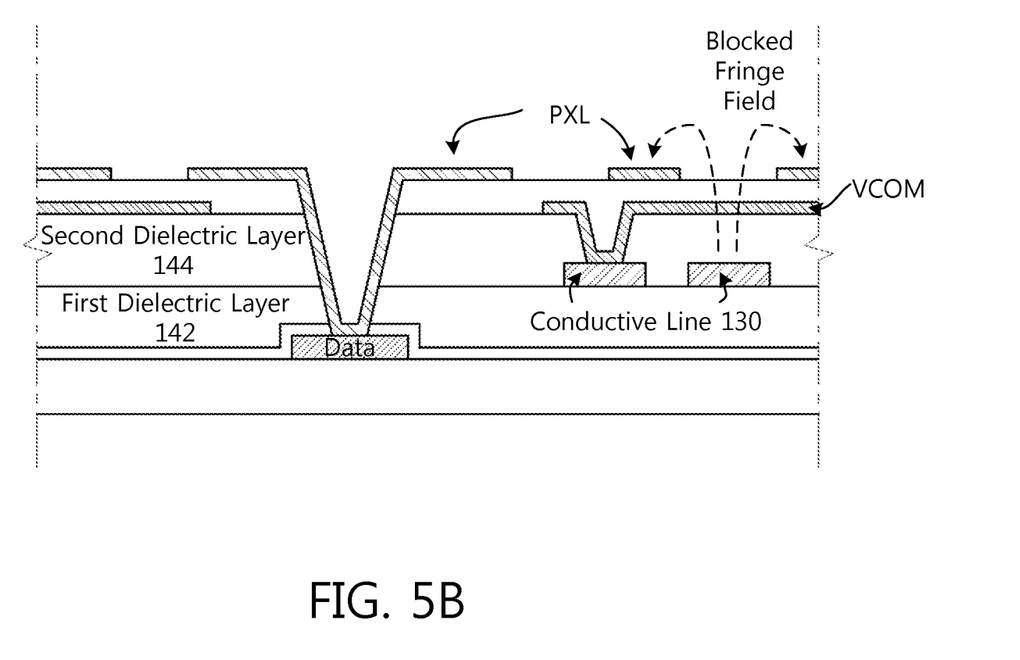

In addition, there is no fringe field generated between the common electrode VCOM and the conductive lines 130 as the common electrode VCOM positioned above the conductive lines 130 as depicted in FIG. 5B. This effectively solves the light leakage problem caused by having the conductive lines 130 in the same layer as the pixel electrode PXL.

According to the embodiments of the present invention, instead of forming one TX channel by electrically connecting the plurality of touch driving blocks 112 inside the active area of the panel 110, the driving signal lines 132 are routed parallel to the data line to the inactive area to be connected with the same channel driving signal lines 132. This can increase the aperture ratio of the display pixels in the panel 110.

Instead of connecting the driving signal lines 132 to the left and right sides of the panel 110, the driving signal lines 132 connected to the touch driving blocks 112 of the panel 110 is extended to the inactive area at the upper or lower sides of the panel where the DDI 120 is disposed. This allows to reduce the size of the inactive areas at the left and right width (i.e., left and right Bezel width) of the panel 110.

Moreover, the function of switching the common voltage is built in the DDI 120, and thus, the existing TDI can be used without providing additional touch IC in the panel 110.

Since the embodiments of the present disclosure are described in reference to a LCD device, the common voltage generated by the common voltage generator 122 was described as being used to control the LC molecules. Further, each of the touch driving blocks 112 and the touch sensing blocks 114, which are part of a plurality of block type common electrodes, are described to operating the displays pixels. However, it should be noted that the common electrode blocks and the common voltage described in the embodiments of the disclosure can serve various other purposes in other embodiments.

In some other embodiments, the touch driving blocks 112 and the touch sensing blocks 114 may serve as cathodes for providing electrons to organic-light-emitting-diodes (OLED) pixels such that organic electroluminescence materials interposed between the cathodes and anodes emit light. As such, the touch driving blocks 112 and the touch sensing blocks 114 are preferably formed of transparent materials such as Indium Titanium Oxide (ITO) or a very thin layer of MgAg and the like.

For instance, the common voltage generated from the common voltage generator 122 may be used in activating OLED pixels in the OLED display device during the display period. The use of the common electrode blocks and the common voltage is not limited to displaying images from the panel 110. In addition to touch sensing functionality, the common electrode blocks and the common voltage may be used in measuring amount of pressure, generating vibration or actuating electro-active materials from the panel 110.

The touch driving blocks 112 and the touch sensing blocks 114 need to be formed as isolated blocks and loaded with touch driving/sensing voltage signals during the touch scanning period to serve as a touch sensor for the display device 100. However, the functionalities of the touch driving blocks 112 and the touch sensing blocks 114 during other periods is not limited to activating the pixels (e.g., LCD pixel, OLED pixel) as described above.

For example, some embodiments of the display device 100 may include a layer of deformable material. The touch driving blocks 112 and the touch sensing blocks 114 may be interfaced or positioned near the deformable material, and loaded with voltage signals to measure electrical changes caused by the deformation of the deformable material. In such embodiments, the touch driving blocks 112 and the touch sensing blocks 114 can also measure the amount of pressure on the display device 100. Here, the same touch driving blocks 112 and the touch sensing blocks 114 can be used as the common electrodes (or cathodes) for operating the pixels, used as the touch sensor and also used as the pressure sensor.

In some embodiments, the deformable material may be electro-active materials, which the amplitude and/or the frequency of the material can be controlled by electrical signals and/or electrical field. The examples of such deformable materials include piezo ceramic, electro-active-polymer and the like. In such embodiments, the touch driving blocks 112 and the touch sensing blocks 114 can be used to bend the deformable material into desired directions and/or to vibrate at desired frequencies, thereby providing tactile and/or texture feedback on the display device 100.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:

1. An apparatus, comprising:
   a plurality of data lines on a substrate;
   a plurality of gate lines on the substrate intersecting with the plurality of data lines;
   thin-film transistors on the substrate;
   a first organic dielectric layer planarizing a surface over the thin-film transistors;
   a plurality of conductive lines on the first organic dielectric layer;
   a second organic dielectric layer planarizing another surface over the plurality of conductive lines and on the first organic dielectric layer;
   a plurality of touch driving blocks and touch sensing blocks as segmented common electrode blocks provided with a common voltage signal via the plurality of conductive lines during a display period, the touch driving blocks and the touch sensing blocks on the second organic dielectric layer; and a plurality of pixel electrodes at least a part of which is on the second organic dielectric layer.

2. The apparatus of claim 1, wherein the conductive lines are routed across an active area to an inactive area of the substrate.

3. The apparatus of claim 1, wherein a subset of the conductive lines configured to carry driving signals for sensing a touch is connected to the touch driving blocks of a single touch driving channel and is electrically connected together in an inactive area of the substrate.

4. The apparatus of claim 1, wherein each of the plurality of the touch driving blocks is arranged in a same row among the plurality of touch driving blocks.

5. The apparatus of claim 1, wherein two or more touch sensing blocks are arranged in a same column among the plurality of touch sensing blocks as a touch sensing channel, and a subset of conductive lines configured to carry touch sensing signals is electrically connected together in an inactive area of the substrate.

6. The apparatus of claim 1, wherein the plurality of segmented common electrode blocks arranged in a single column defines two or more touch sensing channels.

7. The apparatus of claim 6, wherein each of the common electrode blocks defining said at least two or more touch sensing channels in the single column is connected to a discrete sensing line routed to an inactive area of the substrate.

8. The apparatus of claim 6, wherein at least one of the touch sensing channels in the single column of the common electrode blocks is defined by two or more common electrode blocks that are individually connected to a discrete sensing line routed to an inactive area of the substrate and electrically connected to each other within the inactive area.

9. The apparatus of claim 1, wherein a first driving channel is positioned at a top edge of an active area of the substrate and a last touch driving channel is positioned at a bottom edge of the active area.

10. The apparatus of claim 9, wherein the touch sensing blocks defining first and last touch sensing channels have a narrower width than other touch sensing blocks of touch sensing channels positioned between the first and the last touch sensing channels.

11. The apparatus of claim 9, wherein the touch driving blocks defining the first and last touch driving channels have a shorter height than other touch driving blocks of touch driving channels positioned between the first and last touch driving channels.

12. The apparatus of claim 1, wherein at least some of the plurality of driving lines, which are connected to their respective segmented common electrode blocks, are routed to an inactive area of the substrate by crossing over one or more common electrode blocks that are connected to another one of the plurality of driving lines.

13. The apparatus of claim 1, wherein a thickness of the first organic dielectric layer is at least 1 um or more, and wherein a thickness of the second organic dielectric layer is at least 1 um or more.

* * * * *